United States Patent
Kreuzer

[11] Patent Number: 6,098,286
[45] Date of Patent: Aug. 8, 2000

[54] METHOD FOR PRODUCING A STEERING-WHEEL COVER

[75] Inventor: Martin Kreuzer, Kleinwallstadt, Germany

[73] Assignee: TRW Automotive Safety Systems GmbH, Aschaffenburg, Germany

[21] Appl. No.: 09/230,293

[22] PCT Filed: May 22, 1998

[86] PCT No.: PCT/EP98/03028

§ 371 Date: Jan. 22, 1999

§ 102(e) Date: Jan. 22, 1999

[87] PCT Pub. No.: WO98/52796

PCT Pub. Date: Nov. 26, 1998

[30] Foreign Application Priority Data

May 24, 1997 [DE] Germany ............................ 197 21 789

[51] Int. Cl.⁷ .................................................. B21D 53/26
[52] U.S. Cl. ................ 29/894.1; 264/313; 264/DIG. 44; 74/552
[58] Field of Search ............................... 29/894.1; 74/552; 264/DIG. 44, 271.1, 275, 313

[56] References Cited

FOREIGN PATENT DOCUMENTS

| 0732237 | 9/1996 | European Pat. Off. . |
| 2287305 | 9/1995 | United Kingdom . |

*Primary Examiner*—P. W. Echols
*Attorney, Agent, or Firm*—Tarolli, Sundheim, Covell, Tummino & Szabo L.L.P.

[57] ABSTRACT

For the production of a steering wheel with a seamless casing, surrounding the steering wheel rim, the steering wheel spokes and the central region for an airbag covering with tear-open lines, of a plastic moulded part produced in one piece by casting or injection moulding, with a closed surface and a possibly foamed base body, a method is proposed which is characterized in that a core of a low-melting material is fastened to the central base part of the steering wheel skeleton structure, that thereafter the steering wheel skeleton structure and the core are placed into a mould for the formation of the plastic moulded part, that the plastic moulded part is produced and that after the setting of the plastic moulded part, the core is melted by an increase in temperature and the material is removed in liquid form from the plastic moulded part.

9 Claims, 1 Drawing Sheet

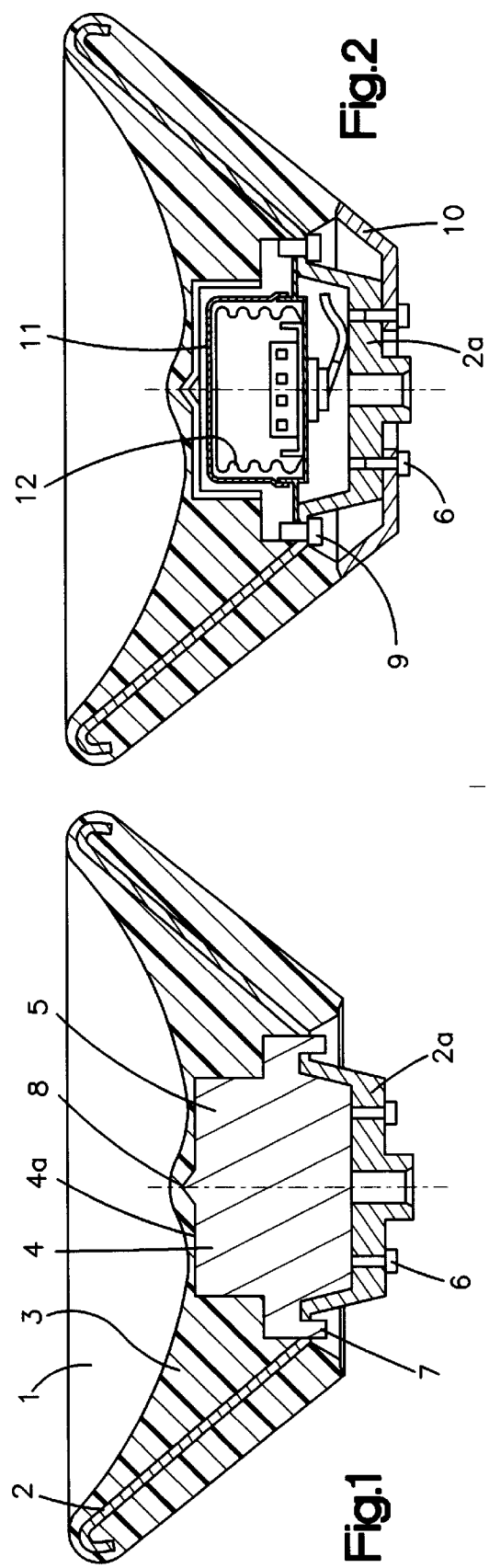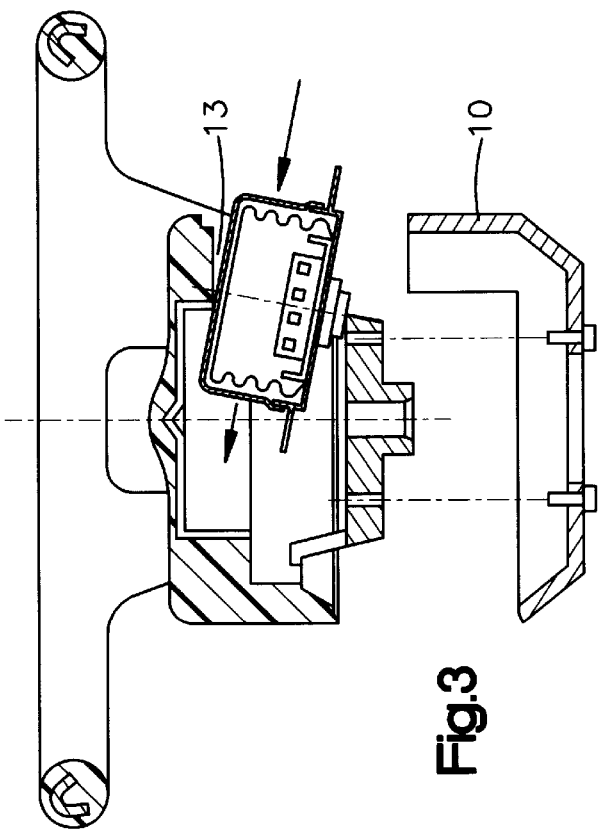

METHOD FOR PRODUCING A STEERING-WHEEL COVER

FIELD OF THE INVENTION

The invention relates to a method for the production of a steering wheel with a seamless casing which surrounds the steering wheel rim, the steering wheel spokes and the central region of the steering wheel which comprises an airbag covering with tear-open lines. The steering wheel casing is a plastic moulded part produced in one piece by casting or injection moulding, with a closed surface and a possibly foamed base body.

BACKGROUND OF THE INVENTION

The majority of casings of steering wheels with an integrated airbag are constructed today in two parts. A moulded part surrounding the skeleton structure of the steering wheel and with a separately produced covering for the airbag installation opening in the hub region of the steering wheel, with great efforts being made to match the two parts to each other visually and haptically. Considerable further difficulties result from the fact that the airbag covering has to be constructed so that the covering is able to be torn open and is also movable relative to the steering wheel hub by the touch stroke necessary for actuating the horn.

As a gap between the moulded part encompassing the steering wheel and the airbag covering is regarded as being visually disadvantageous, it has already been proposed to produce the moulded part and airbag covering in one piece. Owing to the tear-open and actuation functions to be taken into account in the region of the airbag coverings, such methods involve certain substantially solvable difficulties with regard to manufacturing technique and compulsorily require a largely new design of the steering wheel construction, because the installation can only take place from the rear side of the steering wheel and because special precautions have to be taken for the introduction of the airbag module with folded gas bag and gas generator. One known design involves dividing the steering wheel skeleton structure into a base part with hub and possibly spoke stumps and a steering wheel rim with spokes. The base part can be equipped with the airbag module and other functional parts, before the steering wheel rim is attached to the base part and the entire skeleton structure is covered by a one-piece sheathing.

It is regarded as particularly disadvantageous here that the fastening between base part and steering wheel rim involves an additional material expenditure and adds weight to the structure, which counters the general aim for saving weight in automobile construction. In addition, it is difficult to match the two components optimally to each other with regard to dimensions. In particular, the gas bag covering, as a moulded part, is provided with considerable tolerances. Because the gas bag covering has to be able to be torn, it must not have any particular inherent rigidity and therefore requires the folded gas bag as a support. If the gas bag covering is too "thin", the covering is not sufficiently supported, if it is too "thick", it is buckled upwards. Both are undesirable.

Similar problems result with regard to the actuation movements which have to be transferred from the exterior via the plastic moulded part, which is constructed in one piece on the steering wheel rim, onto the actuating members mounted in the base part. It should be readily clear that the adaptation of a surface, produced by casting mould technique, to a mounted surface is very costly with regard to manufacturing technique, and that the transfer functions can only be carried out reliably with regard to operation if very close tolerances can be maintained in adaptation.

Resulting from this is the problem of further developing the method initially mentioned so that all the above-mentioned difficulties can be overcome and so that a one-piece plastic part for encasing a steering wheel can be provided. with a justifiable economic expenditure.

SUMMARY OF THE INVENTION

To solve this problem, it is proposed according to the invention that a core of a low-melting material is fastened to the central base part of the steering wheel skeleton structure. Thereafter the steering wheel skeleton structure and the core are placed into a mould for the formation of the plastic moulded part. The plastic moulded part is then produced and after the setting of the plastic moulded part has occurred, the core is melted by an increase in temperature and the low-melting material is removed in liquid form from the plastic moulded part.

Through the use of a core of low-melting material, the plastic moulded part can be produced having an accurately dimensioned hollow space, into which subsequently the airbag module can be introduced. The airbag module itself cannot be used as the core, owing to the "soft" surface of the gas bag package, because the predefined fracture line necessary in the covering region of the plastic moulded part can not be produced in a reproducible manner. On the other hand, using a core of low-melting material in combination with the outer form, a very precisely dimensioned line of small wall thickness can be produced in the plastic moulded part. The fracture line produced using the low-melting material core has a sufficient strength, close tolerances, and, upon inflation of the gas bag, tears open reliably and immediately. The production of the covering region is thus just as simple as with a covering produced as a separate component. Further, predefined tear lines can be realized which are able to be stressed sufficiently in normal operation and are able to be easily torn open in an emergency, just as reinforcement inserts and components acting as a hinge. In addition, through the production in one piece it is ensured that the steering wheel and covering regions have the same appearance visually and haptically.

As material, removable by melting, for the core, in particular a tin/bismuth alloy comes into consideration, melting at approximately 114° C. However, suitable melting waxes or fluids can also be used, because the mould cores only have to have short service lives, and because the formation times for the plastic moulded parts are very short, i.e. are in the range of 120 to 240 seconds. Through an advance cooling process of the mould cores, the service life of such a wax or fluid core can be substantially increased.

Further advantages of the method according to the invention result from the fact that the easily melting material used for the cores can be almost completely recovered on melting and can be used again for the production of cores.

The disclosed method can be adapted to the most varied of purposes of use and requirements. By the invention, accordingly, a method is proposed by which not only the difficulties initially mentioned can be overcome, but rather also is extremely flexible and reliable in operation.

BRIEF DESCRIPTION OF THE DRAWINGS

The method according to the invention is explained in further detail with the aid of the example embodiment illustrated in simplified form in FIGS. 1 to 3.

FIG. 1 shows a section through a steering wheel with melting core and

FIG. 2 shows a section through a steering wheel according to FIG. 1 with incorporated airbag module and FIG. 3 shows a section through a steering wheel perpendicular to the section according to FIG. 1.

DETAILED DESCRIPTION OF PREFERRED EMBODIMENTS

In FIG. 1 a section is illustrated through a simplified steering wheel 1, which comprises a steering wheel skeleton structure with spokes 2 and a hub part 2a and also a plastic moulded part 3, and the central installation space of which is occupied by a core 5 able to be removed by melting. The material of the core 5 is melted by increasing the temperature of the entire steering wheel 1 to a level which is higher than the melting point of the core, but which is lower than the melting point of the plastic molded part 3 so that the core material takes a liquid form which is easily removed from the plastic molded part. The material of the core 5 preferably comprises a tin/bismuth metal alloy having a melting point of approximately 114° C. Alternatively, the material of the core 5 may be a wax having a melting point between 60° C. and 115° C., or a solidified fluid having a melting point between −10° C. and 10° C. The core 5 is aligned to the hub part 2a by means of core pins 7 and screws 6 and is then inserted with the skeleton structure into a casting mould or injection mould, not illustrated, in which the plastic moulded part 3 is formed. The plastic moulded part 3, as usual, encompasses the steering wheel rim and the spokes 2. It has an integrally formed covering cap 4 for the airbag module 12 (see FIG. 2), which after the removal by melting of the core 5 is installed in the resulting cavity. The plastic moulding part 3 is preferably produced using a foamable polyurethane material. Alternatively, the plastic molded part 3 could be produced using a two-step molding process which results in two layers of different thermoplastic materials, as is known in the art.

The core 5 has a core ridge 8 for the formation of the predefined fracture site in the covering cap 4, into which in a manner known per se a reinforcement insert 4a can be formed. The reinforcement insert 4a may be made from a plastic fabric, a plastic net, a perforated metal foil, or a plastic film. The reinforcement insert 4a is omitted or interrupted along the tear lines (not shown) in the central region of the plastic molded part 3.

In FIG. 2, in the cavity 11 which results after the removal by melting of the core 5 (see FIG. 1), an airbag module 12 is inserted and is fastened to the hub part 2a by means of the screws 9. In addition, a steering wheel rear covering 10 is illustrated in section, which is likewise fastened to the hub part 2a by means of the screws 6. Otherwise, FIG. 2 corresponds to FIG. 1; further explanations and reference numbers are therefore not necessary.

FIG. 3 shows a section through the steering wheel perpendicular to the steering wheel axis, but rotated through 90° with respect to the sections according to FIGS. 1 and 2. Hence the opening 13 becomes visible, which is provided between plastic moulded body 3 and steering wheel skeleton structure 2, 2a, in order to be able to install the airbag module 12 into the cavity 11.

What is claimed is:

1. A method for the production of a steering wheel comprising a skeleton structure including a rim, spokes, and a base part, said steering wheel further comprising a central region for an airbag covering and a seamless casing of a plastic molded part having a continuous uninterrupted outer surface and a base body, the casing surrounding said rim, said spokes, and said central region and having tear-open lines, said method comprising the steps of:

fastening a core of a material having a melting point lower than that of said plastic molded part to said base part of said skeleton structure;

placing said skeleton structure and said core in a mould;

forming said plastic molded part in one piece by casting or injection molding;

setting of said plastic molded part;

melting said core by an increase in temperature to a temperature higher than said melting point of said core but lower than said melting point of said plastic molded part; and removing said core material in liquid form from said plastic molded part.

2. The method according to claim 1 wherein said core material comprises a tin/bismuth metal alloy having a melting point of approximately 114° C.

3. The method according to claim 1 wherein said core materials comprises a wax having a melting point between 60° C. and 115° C.

4. The method according to claim 1 wherein said core material comprises a solidified fluid having a melting point between −10° C. and +10° C.

5. The method according to claim 1 wherein said casing is produced from a plastic material by a foam method.

6. The method according to claim 5 wherein said plastic material is a foamable polyurethane.

7. The method according to claim 1 wherein said casing is produced from two different plastic materials.

8. The method according to claim 7 wherein said two plastic materials are thermoplastic plastics.

9. The method according to claim 1 wherein in said central region for an airbag covering, said casing is formed with a reinforcement insert of one of a plastic fabric, a plastic net, a perforated metal foil, and a plastic film, said reinforcement insert being interrupted along said tear-open lines.

* * * * *